D. L. LINDQUIST AND F. HYMANS.

ELEVATOR.

APPLICATION FILED OCT. 30, 1920.

Reissued June 14, 1921. 15,125.

3 SHEETS—SHEET 1.

Inventors.

David L. Lindquist
Frederick Hymans
Attorney
L. H. Campbell

D. L. LINDQUIST AND F. HYMANS.
ELEVATOR.
APPLICATION FILED OCT. 30, 1920.
Reissued June 14, 1921. 15,125.
3 SHEETS—SHEET 2.
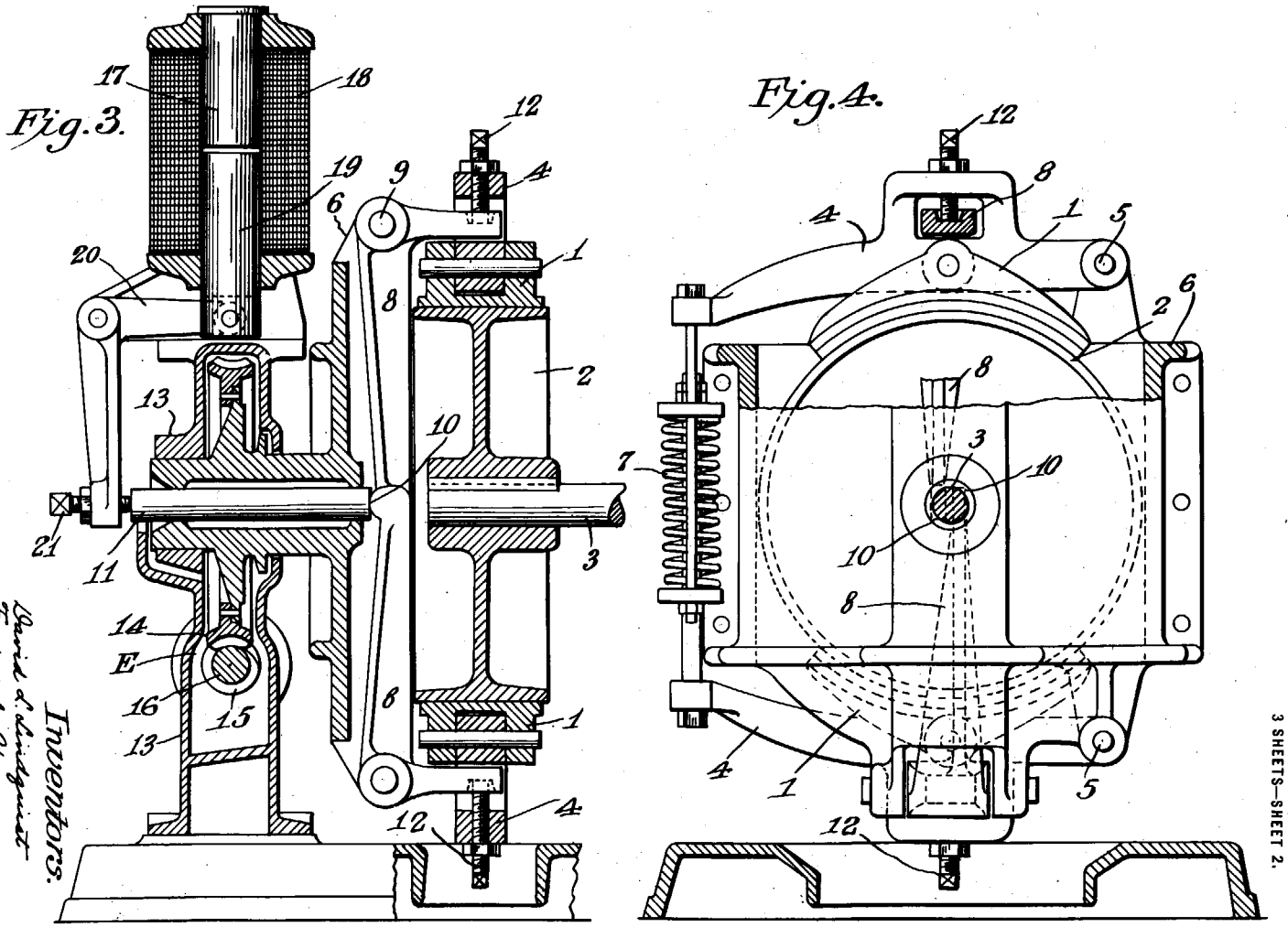
Inventors.
David L. Lindquist
Frederick Hymans
Attorney
L. W. Campbell

D. L. LINDQUIST AND F. HYMANS.

ELEVATOR.

APPLICATION FILED OCT. 30, 1920.

Reissued June 14, 1921. 15,125.

3 SHEETS—SHEET 3.

Inventors.

David L. Lindquist
Frederick Hymans
Attorney
L. H. Campbell

UNITED STATES PATENT OFFICE.

DAVID L. LINDQUIST, OF YONKERS, NEW YORK, AND FREDERICK HYMANS, OF GLEN RIDGE, NEW JERSEY, ASSIGNORS TO OTIS ELEVATOR COMPANY, OF JERSEY CITY, NEW JERSEY, A CORPORATION OF NEW JERSEY.

ELEVATOR.

15,125. Specification of Reissued Letters Patent. Reissued June 14, 1921.

Original No. 1,283,827, dated November 5, 1918, Serial No. 64,396, filed December 1, 1915. Application for reissue filed October 30, 1920. Serial No. 420,840½.

*To all whom it may concern:*

Be it known that we, DAVID L. LINDQUIST, residing in Yonkers, in the county of Westchester and State of New York, subject of the King of Sweden, and FREDERICK HYMANS, residing in Glen Ridge, county of Essex, State of New Jersey, citizen of the Netherlands, have invented a new and useful Improvement in Elevators, of which the following is a specification.

Our invention relates in general to load carrying devices, and is directed more particularly to an electrically controlled elevator or hoist.

An object of the invention is the provision of automatic means for effecting an exact landing of a load carrying device such as an elevator car, at a predetermined point or points regardless of the load and speed of the device.

Other objects of the invention will appear hereinafter, the novel combinations of elements being pointed out in the appended claims.

Figure 2:
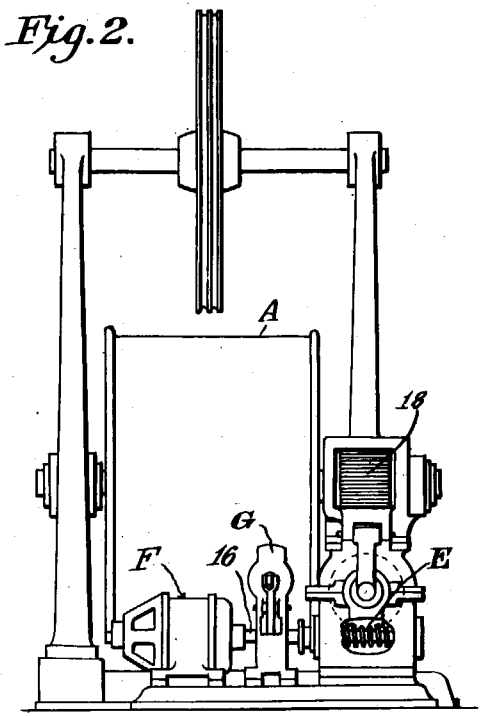
Figure 1:
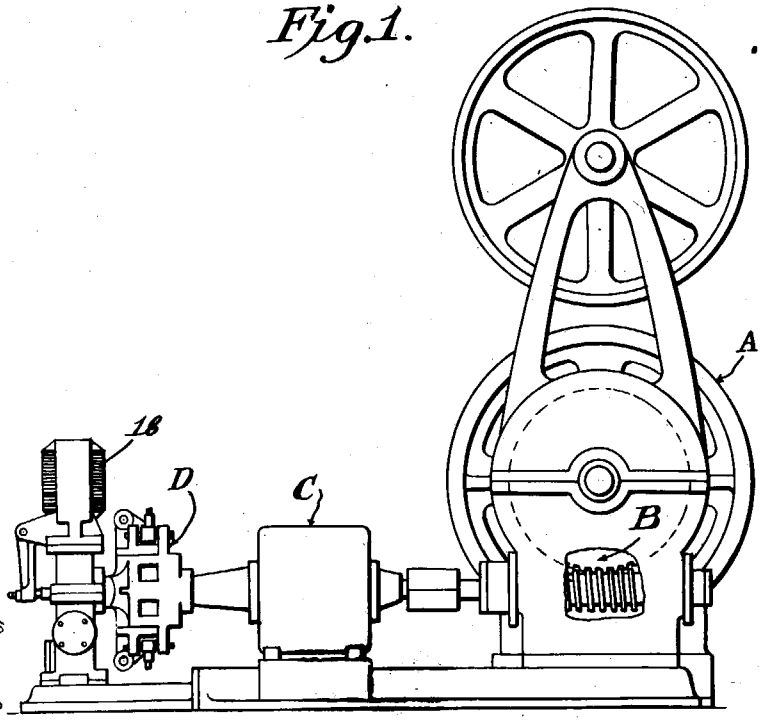
Figure 5:
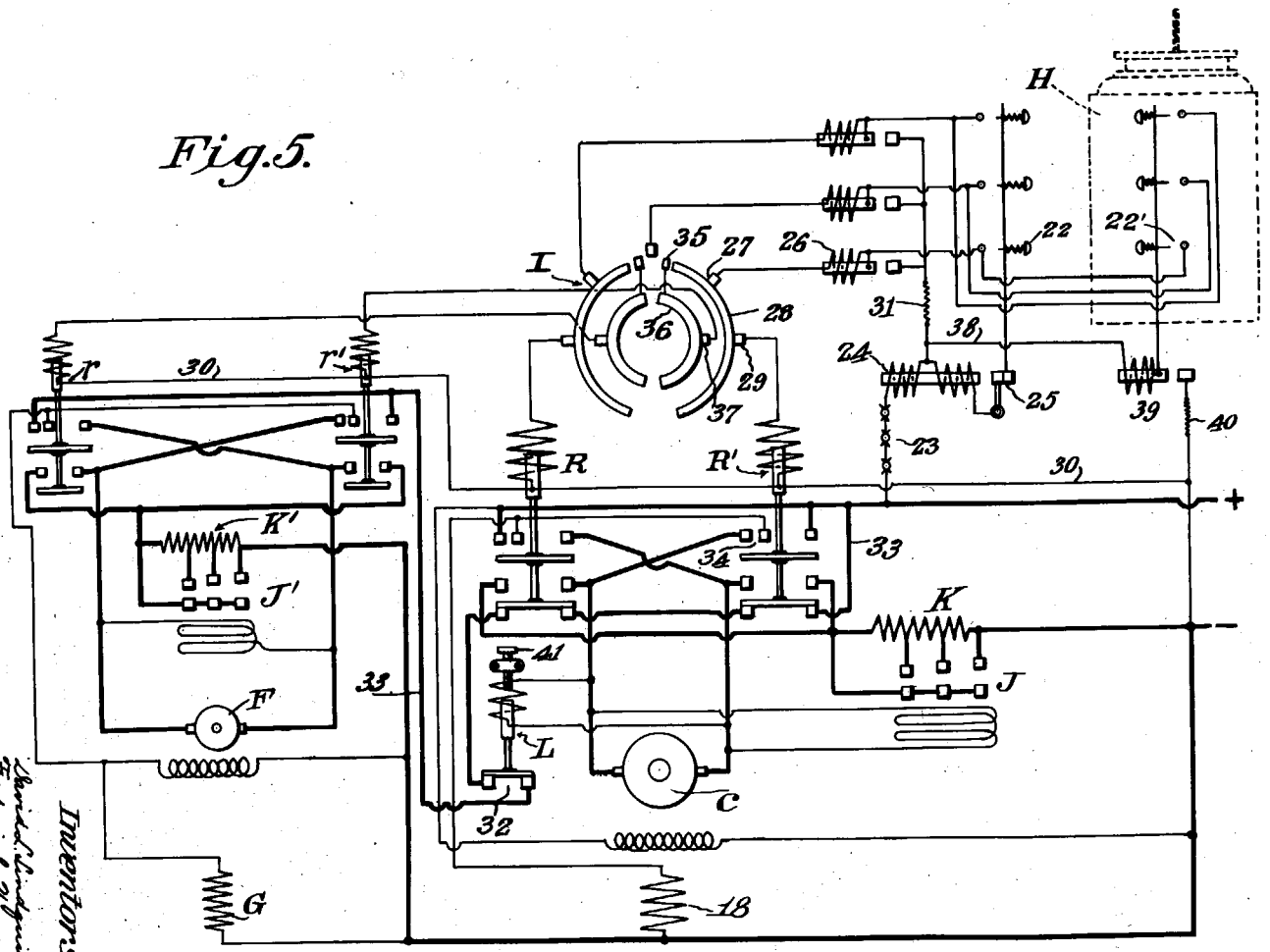

In the drawings accompanying this specification, Figure 1 represents in elevation view one embodiment of our invention; Fig. 2 is an end view of Fig. 1; Fig. 3 is a sectional view of the combined friction brake and coupling shown in Figs. 1 and 2; Fig. 4 is an end view of Fig. 3 shown in part section; Fig. 5 is a wiring diagram of a system of direct current electrical circuits which may be used in carrying out our invention.

Like reference characters denote similar parts in all of the figures.

Generally speaking, our invention comprises an elevator or other load carrying device adapted to be operated at different speeds by means of different motors, and means for automatically transferring the load from one motor to another motor as the load carrying device approaches its stopping point.

It has long been recognized that one of the means for effecting an accurate stop of an elevator car at a landing or other stopping point consists in reducing the speed before reaching the same. This reduced speed in order to be effective must be independent of the load and should be a small fraction of the normal or full speed. When a single motor is used for hoisting purposes, it is practically impossible to effect sufficient speed reduction where a high degree of accuracy in stopping is required, and this is true particularly when the elevator car is operated by an electric motor at high speed under a wide variation in load. By reason of our invention we are enabled to reduce the speed of the car to any desired predetermined low speed just before making a landing so as to insure an accurate or exact landing regardless of the load and also resulting in other advantages which will be pointed out later on. While the invention lends itself to any hoisting apparatus, it is particularly adapted to an automatically controlled elevator.

Referring to the drawings, the particular embodiment of our invention therein illustrated comprises a cable sheave or winding drum A which in the present instance is operatively connected through the worm gearing B to an electric motor C although the motor and sheave A could be directly connected if so desired. The gearing B is also connected through a combined clutch and brake D and worm gearing E to an additional electric motor F having a brake G associated therewith. The motors C and F may be of any desired kind of power units such for example as alternating or direct current electric motors, the latter type of motor being shown by way of illustration with a view to simplicity.

The combined brake and clutch D which operates to slow down the hoisting drum and permit a transfer of the load from the main motor C to the auxiliary motor F, is shown in detail in Figs. 3 and 4, and comprises a pair of brake shoes 1, 1, adapted frictionally to engage a brake pulley 2 secured on the shaft 3 of the motor C. Each brake shoe is carried by a corresponding lever 4 pivoted at 5 to the frame 6, the other end of each lever 4 being acted upon by compression spring 7 tending to force the shoes into frictional braking engagement with the pulley 2. In order to release the brake shoes from the pulley 2, we provide a pair of bell crank levers 8, 8, pivoted at 9 to the frame 6, the vertical arm of each lever terminating in a rounded nose 10 in horizontal alinement with a sliding rod 11, while the horizontal arm of each lever 8 engages the corresponding lever 4, 4, through an adjustable screw 12, 12. The frame 6 is journaled in the gear casing 13 and carries a worm wheel 14 meshing with a worm 15 secured to the shaft 16 of the auxiliary motor F shown in Fig. 2. An electromagnet 18 is arranged to operate the levers 8, 8, to effect the release of the brake shoes 1, 1, and the same comprises a fixed and movable magnet core 17 and 19, respectively, the latter being connected to one arm of a bell crank lever 20, while the other arm of this lever carries an adjustable screw 21 coacting with the sliding rod 11.

The operation of the apparatus is as follows: When all parts are at rest, the magnet 18 of the combined brake and clutch D is de-energized and the brake shoes 1, 1, are applied thus coupling the winding drum A up to the auxiliary motor F which is prevented from accidental rotation by reason of the brake G which is applied at this time. The first step in the operation is to excite the magnet 18 to release the brake shoes 1, 1, and to close a circuit to the main motor C. This results in severing all connection between the hoisting drum and the auxiliary motor F, and allows the motor C to start the load, and after a short period of acceleration, operate the latter at full normal running speed. Shortly before reaching the desired floor landing or other stopping point, the circuit to the motor C and magnet 18 is interrupted and the latter allows the spring 7 to apply the brake shoes to the pulley 2. The friction of the shoes on the pulley tends to drive the auxiliary motor through the gearing E, but the motor F will not rotate at this time, since it is prevented from doing so by the brake G. The effect therefore of the brake clutch D is that of an ordinary friction brake which would eventually bring the hoisting apparatus to rest. When the speed of the latter has been reduced to a sufficient extent, the brake G and the motor F are energized and the latter drives the load at a very low speed since the motor F acts on the load through a double gear reduction comprising the worm gearing E and B. This slow speed is a constant speed regardless of the load and is maintained until the load substantially reaches the landing whereupon the circuit to motor F is interrupted and the brake G applied to stop and hold the load exactly at the landing.

It will be observed that when the load carrying device is being driven at slow speed by the auxiliary motor F, the maximum torque which can be exerted upon the hoisting drum is limited to the friction existing between the brake shoes, 1, 1, and the pulley 2. This feature is of great practical value particularly in the case of inclined railways or ammunition hoists having a positive or head-on landing stop. Under the usual practice, failure to stop at the proper instant is almost certain to damage the hoisting machinery or other parts, whereas by means of our invention the stopping point is approached at a very low speed and even though the auxiliary motor should not be cut off from the source of power at the proper instant the brake shoes 1, 1, would merely slip upon the pulley 2. With proper design the torque transmitted by the brake clutch D may easily be kept within limits which will not permit excessive strains on the hoisting apparatus or other parts in case of overrun.

Referring to Fig. 5, we show a system of direct current circuits which may be used where the main and auxiliary motors C and F, respectively, are direct current shunt wound electric motors. In this figure, H represents an elevator car or other load carrying device adapted automatically to be operated by push buttons arranged in the car and at each floor landing. R and R′ designate the switches for starting, stopping and reversing the main motor C while K is a starting resistance automatically controlled by the accelerating magnet J. The parts $r$, $r'$, K′ and J′ in like manner control the starting, stopping, reversing and accelerating, respectively, of the auxiliary motor F. I represents a floor controller which is operated by some moving part of the hoisting apparatus such as the winding drum in the usual way, and the same, acting in conjunction with the relay L, effects the transfer of the load from the main to the auxiliary motor at the proper time in accordance with the position of the car with respect to a designated floor landing or other stopping point. If desired the floor controller may comprise a series of switches in the hatchway operated by the car or counterweight either arrangement of floor controller being well known in the art. As indicated on the drawing, the system of push buttons is arranged for three floor landings and the car is at rest at the second floor.

The operation is as follows: A person on the ground floor desiring to use the elevator, presses the button 22 at that floor. This establishes a circuit from the + main, through the door contacts 23, through the reversely wound magnet coils of the magnet 24, contacts 25, push button 22, winding of the floor relay 26, to the contact 27 of the floor controller I. The circuit continues through the segment 28 and contact 29 to the winding of the reversing switch R′ and is completed by way of the conductor 30 to the — main. The reversing switch R′ and floor relay 26 both operate to close their respective contacts, the switch R′ closing circuit to the motor C through the starting resistance K, and simultaneously opening any possible circuit to the auxiliary motor through the bottom contacts of the switch as long as the switch is in raised position. The operation of the relay 26 establishes a self holding circuit comprising the left hand winding of the magnet 24 and resistance 31, this circuit being in shunt to the circuit including the contacts 25 and the push button 22. In consequence of this self holding circuit, the contacts 25 become separated and hence the other floor buttons are rendered dead and there can be no interference in the operation in case another of the buttons be operated. As the motor C starts to build up a counter-electro-motive force, the accelerating magnet automatically and gradually short-circuits the starting resistance J in a well-known way and the motor quickly runs up to full normal speed. In the meantime the relay L having its operating magnet connected in direct shunt to the main motor armature separates its contacts 32.

It will be observed that the closing of the reversing switch R′ completes a circuit to the magnet 18 of the brake clutch D at the contact 34, hence the brake shoes 1, 1, are released from frictional engagement with the pulley 2 and the auxiliary motor F is entirely disconnected from the hoisting apparatus.

The main motor continues to operate the hoisting apparatus at full speed while the floor controller is slowly being revolved in a clockwise direction until finally as the car approaches the ground floor, the contact 27 of the floor controller bridges the segment 28 and contact 35. A circuit in parallel to the magnet of the reversing switch R′ is now closed, said circuit comprising the contact 35, segment 36, contact 37, and the winding of the reversing switch $r'$. The latter at once closes its contacts to establish the proper connections for the auxiliary motor F and brake G but neither of them as yet receives current from the main line since their circuit is still open at the contacts 32 of the relay L and also at the bottom contacts of the reversing switch. As the floor controller continues to revolve, the contact 27 runs off of the segment 28 and hence the circuit to the reversing switch R′ is interrupted and the switch drops its contacts thereby opening the circuits of the main motor C and the circuit to the winding 18 of the brake clutch D. The latter now acts as a brake on the hoisting apparatus and the speed of the car is gradually reduced. As the speed of the motor C falls off, its counter-electro-motive force becomes less and less until finally the relay L is unable longer to maintain its core in raised position and the contacts 32 are connected together. The circuit to the auxiliary motor F and brake G is now completed at these contacts and the motor F automatically takes up the load and operates it at greatly reduced speed. Just as the load reaches the landing, or in an instant before, as the case may be, the floor controller rotates the contact 35 out of engagement with the contact 27, and the circuit, including the floor relay 26 and reversing switch $r'$ is interrupted at this point. The switch $r'$ immediately opens the circuit of the auxiliary motor F and effects the application of the brake G to stop the hoist exactly at the floor landing.

If one or the other landing push buttons be operated, the car will automatically respond and come to rest at the corresponding floor landing just as in the case of the button 22 just described, the floor controller I automatically controlling both of the motors in every instance in both directions of car travel.

The operation from one of the push buttons in the car is in effect the same as that produced by a floor button although the operating circuit is somewhat different. For example, upon pressing the button 22′ in the car, a circuit is closed from the — main through the door contacts 23, left hand winding of the magnet 24, wire 38, winding of magnet 39, through the push button 22′, floor relay 26, contacts 37 and 29 of the floor controller, and through the reversing switch magnet R′ to the — main. The magnet 24 immediately separates the contacts 25 to prevent any interference from the floor buttons, while the magnet 39 closes its contact to establish a self holding circuit for both of the magnets 24 and 39 including the door contacts 23 and resistance 40. This self holding circuit is maintained after the floor controller has effected the stop of the car at the designated floor landing and is not broken until the landing door has first been opened, thereby opening one of the door contacts 23, and the door then closed. This safety feature prevents any operation from a floor button unless and until the operator in the car has first restored the system to initial position by opening and then closing a door.

In reviewing the operation, it will be observed that the load is transferred from the main motor to the auxiliary motor only after the speed of the car has been very materially reduced, and in every case the amount of speed reduction is predetermined and controlled by the relay L. The latter may readily be designed or adjusted in any of the well known ways, such for example as by means of a set screw 41, to short circuit its contacts at any predetermined speed reduction of the motor so as to obtain the best results in practice. While the relay L supplies a simple means for determining when the auxiliary motor will take hold of the load, it is obvious that any other device responsive to speed condition, such for example as a centrifugal governor, would effect a similar result.

It is desirable that the speed of the car or load carrying device shall first be reduced to a speed substantially the same as the normal speed of the auxiliary motor before the circuit to the latter is closed and its brake G released in order that the auxiliary motor may take up the load without any shock or jar. In some cases it may be desired to effect a full stop of the load carrying device before a landing is reached and before the auxiliary motor is brought into operation. This may readily be done by merely adjusting the relay L or other speed responsive device so that it will not establish the auxiliary motor circuit until the main motor has either completely or substantially come to rest.

In order that the load carrying device shall invariably stop level with a floor or exactly at a given point in its travel, it is essential that the speed be substantially reduced before the stopping point is reached and that the load from then on shall be operated at a constant low speed regardless of the load. This necessitates a constant speed auxiliary motor regardless of what type it may be. In the particular embodiment of our invention this motor is represented as a shunt wound direct current electric motor operating directly across the line, and it is well known that it is the inherent characteristic of such a motor to run at a fixed speed even though the load varies within wide limits and particularly so when the resistance of the motor armature is made as low as possible. If an alternating current induction motor is used in place of a direct current motor, the system of electric circuits would of course have to be modified somewhat so as to be adapted to that type of motor, but the alternating current motor will operate at constant speed even though the load varies, since such motor is inherently a constant speed motor. Other motors, such as steam, hydraulic, etc., could also be used providing they be suitably governed as is customary so as to operate at constant speed with varying loads.

In any event, it is intended that the auxiliary motor be arranged to operate the load at a comparatively low speed, whereas the main motor may operate the load at any speed desired.

From the foregoing, it is obvious that the apparatus disclosed is capable of being modified in many ways without departing from the spirit and scope of our invention, and therefore we desire not to be limited to the precise construction and arrangement of parts herein set forth.

What we claim is:

1. In an elevator, the combination of a car, main and auxiliary hoisting motors therefor, a circuit for the main motor including a switch controlled automatically by movement of the car to open the said circuit, a circuit for the auxiliary motor including contacts controlled automatically by movement of the car, and additional contacts in the auxiliary motor circuit, opened when the circuit to the main motor is closed by the first named switch.

2. In an elevator, the combination of two hoisting motors, and means dependent upon the speed of one motor for controlling the other motor as the car approaches a predetermined stopping point.

3. In an elevator, the combination of a car, two motors operatively connected therewith, and means dependent upon the position of the car with respect to a predetermined point in its travel and upon its speed for transferring the load from one motor to the other.

4. In an elevator, the combination of a car, a motor connected therewith, automatic means for retarding said motor as the car approaches a predetermined stopping point, and an additional motor adapted to be connected to drive the car at a constant slow speed after the speed of the latter has been reduced a predetermined amount.

5. In an elevator, the combination of a car, a motor connected to drive the car, means for retarding the speed of said motor as the car approaches a predetermined stopping point, a second motor adapted to be operatively connected to the car upon the operation of said motor-retarding means, and means dependent on the speed of the car for automatically controlling said second motor.

6. In an elevator, the combination of a car, a motor connected to drive the car, means for retarding the speed of said motor as the car approaches a predetermined stopping point, a second motor adapted to be operatively connected to the car upon the operation of said motor-retarding means, and means dependent on the speed of the car for automatically starting said second motor.

7. In an elevator, the combination of two electric hoisting motors, and means for closing the line circuit to one of said motors in accordance with the counter-electro-motive force of the other motor.

8. In an electric elevator, the combination of two hoisting motors, means for disconnecting one of the said motors from the car upon starting the car, and means for again connecting the said motor and car after the speed of the other motor has been reduced a predetermined amount.

9. In an electric elevator, the combination of two hoisting motors, electro-responsive means for disconnecting one of the said motors from the car upon starting the car and for again connecting the said motor and car after the speed of the other motor has been reduced a predetermined amount.

10. In an elevator, the combination of an electric hoisting motor adapted to drive the car at normal full speed, an additional electric motor adapted to drive the car at a reduced speed, an electrically controlled friction clutch between said additional motor and the car, electro-responsive means for simultaneously releasing said clutch and closing a circuit to the motor for full speed operation of the car, automatic means for applying said clutch and interrupting the circuit of said last named motor as the car approaches a predetermined stopping point, means dependent for its operation upon a predetermined speed reduction of the car for closing a circuit to the additional motor whereby the latter operates to drive the car at reduced speed, a brake for the additional motor, and means for interrupting the circuit of said additional motor and applying the brake to stop the car at the predetermined stopping point.

11. In an elevator system, comprising a car, hoisting cables, hoisting motor mechanism, and a brake pulley and shaft therefor to operate the car, a revolving pressure means, comprising a shaft and lever, to connect the car and the said motor mechanism together, the said shafts being separate and a stationary releasing means to release the pressure means to disconnect the car from the motor mechanism.

12. In an elevator system, comprising a car, hoisting cables, hoisting motor mechanism, and a brake pulley and shaft therefor to operate the car, a revolving pressure means, comprising a shaft and lever, to connect the car and the said motor mechanism together, the said shafts being separate, and a stationary releasing means, comprising a lever, to release the pressure means to disconnect the car from the motor mechanism.

13. In an elevator system, comprising a car and main and auxiliary hoisting motors, a brake pulley and shaft therefor, a revolving pressure means, comprising a shaft and a lever, to connect the car and the auxiliary hoisting motor together, the said shafts being separate, and a stationary releasing means, to release the pressure to disconnect the car from the auxiliary hoisting motor.

14. In an elevator system, comprising a car and main and auxiliary hoisting motors, a brake pulley and shaft therefor, a revolving pressure means, comprising a shaft and a lever, to connect the car and the auxiliary hoisting motor together, the said shafts being separate, and a stationary releasing means, comprising a lever to release the pressure means to disconnect the car from the auxiliary hoisting motor.

15. In an elevator system, comprising a car and main and auxiliary hoisting motors, a brake pulley and shaft therefor, a revolving pressure means, comprising a shaft and a lever, to connect the car and the auxiliary hoisting motor together, the said shafts being separate, and a stationary releasing means, comprising a lever to release the pressure means to disconnect the car from the auxiliary hoisting motor, and connections between the said pressure and releasing means.

In testimony whereof we have signed our names to this specification this 27th day of October, 1920.

DAVID L. LINDQUIST.
FREDERICK HYMANS.